United States Patent
Kolev et al.

(10) Patent No.: US 6,396,818 B1
(45) Date of Patent: May 28, 2002

(54) CALL ROUTING INTERFACE FOR SATELLITE COMMUNICATIONS USER TERMINALS

(75) Inventors: Javor P. Kolev, Cary; Mara A. Frank; Jonathan C. Lohr, both of Raleigh, all of NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/045,473

(22) Filed: Mar. 20, 1998

(51) Int. Cl.[7] .............................................. H04B 7/85
(52) U.S. Cl. .................................... 370/316; 455/427
(58) Field of Search ................................ 370/316, 315, 370/324, 334, 341, 349; 455/13.1, 405, 427, 430, 456, 445

(56) References Cited

U.S. PATENT DOCUMENTS

| 4,087,638 A | | 5/1978 | Hayes et al. |
| 5,450,618 A | | 9/1995 | Naddell et al. |
| 5,903,837 A | * | 5/1999 | Wiedeman ................... 455/427 |
| 5,974,315 A | * | 10/1999 | Hudson ....................... 455/427 |
| 6,006,094 A | * | 12/1999 | Lee ............................. 455/445 |
| 6,067,442 A | * | 5/2000 | Wiedeman et al. ......... 455/13.1 |
| 6,185,295 B1 | * | 2/2001 | Frederiksen et al. ........ 379/355 |

* cited by examiner

Primary Examiner—Wellington Chin
Assistant Examiner—Brenda Pham
(74) Attorney, Agent, or Firm—Coats & Bennett, P.L.L.C.

(57) ABSTRACT

A method and apparatus employing an improved user interface for satellite communications user terminals in satellite communications systems provides call routing information, in particular gateway selection information, during channel request portion of call initiation. In one approach, a symbol, for example a key on a keypad, is associated with gateway selection information, such as a country code and national destination code. When a user thereafter initiates a call by selecting the symbol and causing a subscriber number for a desired destination to be entered, the satellite communications user terminal automatically transmits the gateway selection information associated with the symbol during the channel request portion of call initiation. In another approach, some gateway selection information is selected as a default. Thereafter, the satellite communications user terminal automatically transmits the default gateway selection information, when appropriate, during the channel request portion of subsequent call initiations until the default is changed. User satisfaction with satellite communications user terminals is thereby improved.

13 Claims, 1 Drawing Sheet

CALL ROUTING INTERFACE FOR SATELLITE COMMUNICATIONS USER TERMINALS

FIELD OF THE INVENTION

The present invention relates generally to satellite communication devices, and more particularly to a call routing interface for satellite communications user terminals.

BACKGROUND OF THE INVENTION

Mobile communication systems have proven very popular in the Untied States, as well as in other countries. However, some mobile communications systems, such as cellular telephone systems, serve only limited geographic locations. In addition, there are a wide variety of cellular communications protocols, not all of which are compatible. In an effort to provide greater mobility, satellite-based communications systems have been developed.

One example of a satellite communications system is a system called Asia Cellular Satellite (ACeS). In ACeS systems, a user communicates over the satellite communications system via a user terminal. The user terminal communicates with a satellite orbiting the earth which, under the direction of the Network Control Center (NCC), forwards the communication signal to an appropriate "gateway" near the destination. The gateway is the portion of the satellite communications system which, among other functions, provides connectivity to external communications networks such as the Public Switched Telephone Network, Public Land Mobile Networks, and private terrestrial networks. From the destination gateway, the call is routed to the ultimate destination.

It is important in satellite communications systems that calls be routed to the proper gateway so that the system may operate efficiently and costs may be minimized. The assignment of a call to a particular gateway is based on information exchanged between the satellite communications user terminal and the NCC during a procedure known as call initiation.

Typically, the call initiation procedure in a satellite communications system has two main steps: channel request, which primarily involves the user terminal and the NCC, and call setup which primarily involves the user terminal and the destination gateway. During channel request, the user terminal transmits a call initiation signal to the satellite which routes the signal to the NCC. Included in the call initiation signal is information relating to the type of service required and information relating to which gateway should be used. The term "gateway selection information" will be used herein to refer to the information relating to which gateway should be used. Typically, gateway selection information includes a country code and national destination code. The country code and national destination code typically form a portion of the complete address of the destination, typically referred to as the destination routing information. That is, the country code and national destination code typically are a portion of the complete phone number for a particular destination. The complete destination routing information typically includes a country code, a national destination code, and a subscriber number. In some instances, the gateway selection information may alternatively include a Mobile Country Code (MCC) and Mobile Network Code (MNC). Based on the gateway selection information, the NCC selects the appropriate gateway to manage the communications session. Once the appropriate gateway has been determined, the second step, call setup is entered. In call setup, management of the communications session is typically turned over to the gateway and the NCC for all practical purposes is removed from the communications pathway. The operational details of satellite communications systems, including ACeS systems, are well known in the art and are not further discussed herein except as necessary for understanding of the present invention.

In traditional phone systems, the entry of a partial destination phone number without a country code is presumed to indicate that the destination country code is the same as the originating country code. Likewise, the absence of a national destination code implies that the destination national destination code is the same as the originating national destination code. That is, if a number such as 555-1234 is dialed, the call will be treated as "local" and the destination will be assumed to be the subscriber having the subscriber number 555-1234 and the country code and national destination code of the originating location. This assumption is possible because communications originating from fixed land-line phones, terrestrial cellular phones, or similar terrestrial networks originate through a given switching center having a known location. Hence, the country code and national destination code of the destination may, in effect, be supplied by the other portions of the communications system (other than the user terminal) if not supplied by the user. Thus, traditional phone systems may assume that the destination switching center is the same as the originating switching center unless told otherwise by the user.

In contrast, present satellite-based mobile communications systems are not designed to assume that the destination gateway is the same as the originating gateway, quite simply because there is only one originating gateway—the NCC—in all instances, but a myriad of possible destination gateways. A satellite communications user terminal communicates directly with a satellite, orbiting above the earth's surface. The user terminals are typically designed to be mobile and are further designed to be used from a variety of countries, meaning that the satellite communications user terminal may be making direct contact with the satellite from a wide variety of locations. Neither the satellite nor the ground segments of the satellite system necessarily know the location of the user terminal. As such, assumptions about what country codes and national destination codes are "local" to the user terminal are inappropriate. Accordingly, the user terminal must provide gateway selection information during call initiation so that the satellite communications system may select the proper gateway to handle the call, even if the call is "local." If such gateway selection information is not provided during the channel request portion of call initiation, the call initiation attempt typically fails.

Providing the gateway selection information presents difficulty for some users who are more accustomed to the reactions of a Public Switched Telephone Network (PSTN) or a cellular telephone system. Because such PSTN or cellular systems allow connections to be made with less than complete destination information, due to the assumptions discussed above, some users are not accustomed to being required to enter the equivalent of gateway selection information in order to successfully complete a call. Moreover, phone numbers stored in the phone book of the user terminal are normally in the format appropriate for PSTN or terrestrial cellular systems, i.e. without a complete equivalent of the gateway selection information. But current satellite-based systems need gateway selection information during call initiation in order to function properly. It is believed that user satisfaction would be improved for satellite communications user terminals if the call routing interface was more like the interface used for cellular telephones in terrestrial systems. Accordingly, there is a need for an improved call routing user interface for satellite communications user terminals.

SUMMARY OF THE INVENTION

The present invention provides an improved user interface for satellite communications user terminals in satellite communications systems for providing call routing information. In one approach, a symbol, for example a key on a keypad, is associated with gateway selection information, such as a country de and national destination code. A user thereafter initiates a call by selecting the symbol and causing a subscriber number for the destination to be entered. Thereafter, the satellite communications user terminal automatically transmits the gateway selection information associated with the symbol during the channel request portion of call initiation. In another approach, some gateway selection information is selected as a default. Thereafter, the satellite communications user terminal automatically transmits the default gateway selection information, when appropriate, during the channel request portion of subsequent call initiations until the default is changed. Using the present invention, gateway selection information is supplied by the satellite communications user terminals to the satellite communications system during channel request via a user interface that is more similar to terrestrial communications systems. User satisfaction with satellite communications user terminals is thereby improved.

DETAILED DESCRIPTION

Figure 1:
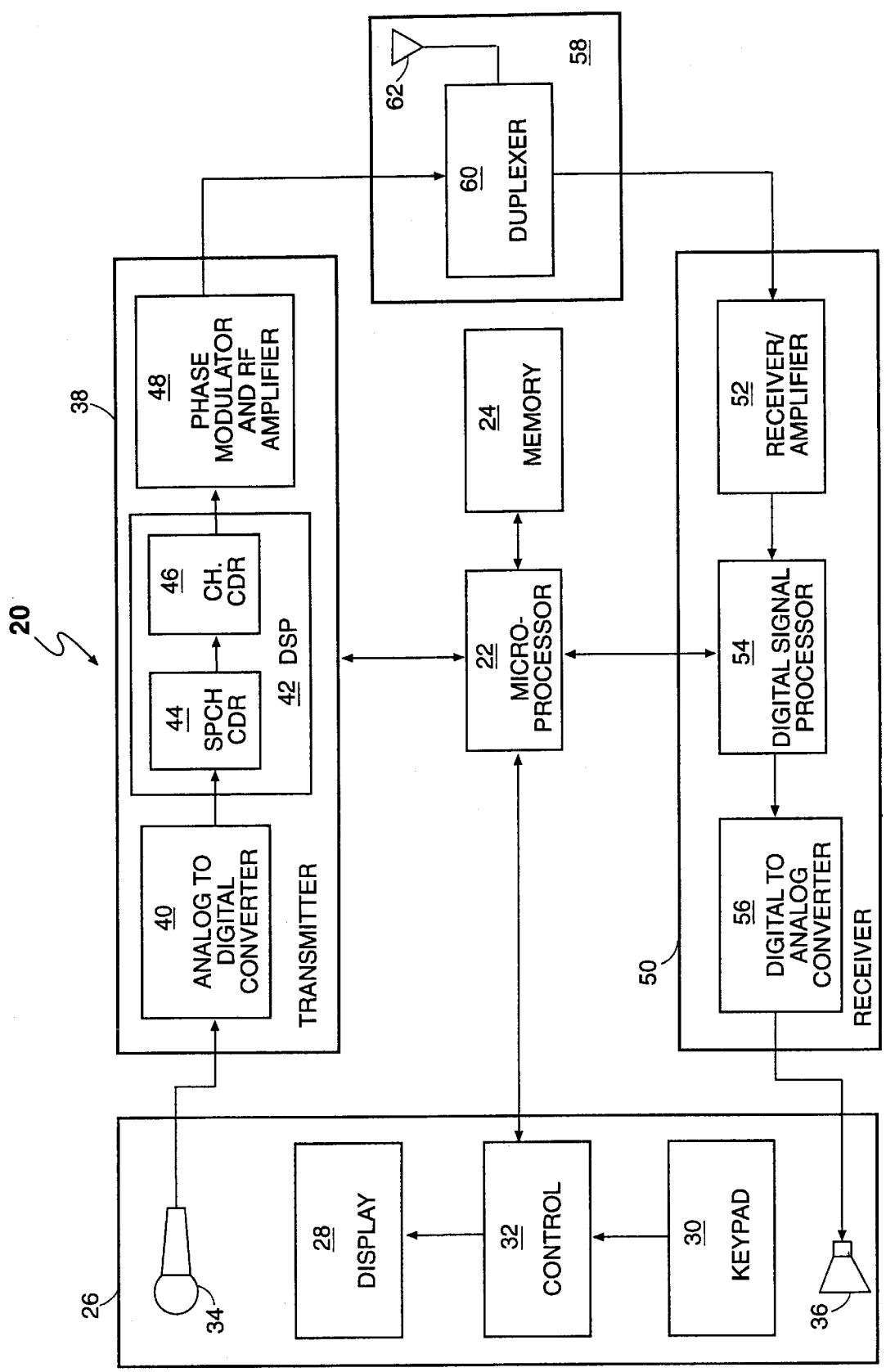
FIG. 1 is a block diagram of one embodiment of a typical user terminal device of the present invention.

The present invention is an improved user interface for providing call routing information by satellite communications user terminals in satellite communications systems. The interface allows the user or the user terminal to select some gateway selection information, such as a country code and national destination code (if selected by the user) or Mobile Country Code and Mobile Network Code (if selected by the user terminal), as a default or to associate the gateway selection information with a particular symbol such as a key on a keypad. Thereafter, the user may be required to enter only the subscriber number for the destination, or the symbol and the subscriber number, during call initiation. The satellite communications user terminal will automatically transmit complete gateway selection information using the preselected defaults or the gateway selection information associated with the symbol during the channel request portion of call initiation. In this manner, the user interface of satellite communications user terminals is made to be more similar to terrestrial communications systems.

Satellite communications systems, such as ACeS systems, operate by routing signals from a mobile user terminal to a satellite orbiting the earth and then on to a destination. Typically, the routing to any destination in any network is via a gateway. The overall satellite communications system is managed by a Network Control Center (NCC). When a user desires to initiate a communications session, e.g. place a call, the user inputs appropriate gateway selection information to the user terminal, such as a country code and national destination code, and a subscriber number for the desired destination. The entry of this information may be through manual entry on a keypad 30 or may be via any other method known in the art, including automatic selection of a subscriber number from a previously entered list via, for instance, a computer connected to the user terminal. The user terminal then enters a call initiation procedure having, for purposes of this discussion, the two main steps described above—channel request and call setup. For proper call routing, it is necessary for the NCC to be supplied with enough gateway selection information to properly identify the appropriate destination gateway during call initiation. In current satellite-based systems, the originating user terminal must supply the gateway selection information to the NCC (via the satellite) during the channel request portion of call origination. Based on the gateway selection information, the NCC notifies the appropriate destination gateway and passes control of the communications session to that destination gateway.

The present invention relates to methods of deriving and methods of use of gateway selection information during channel request, not methods of deriving and methods of use of destination routing information by the gateway during call setup.

Using the present invention, the user terminal allows calls to be initiated without the user having to enter the entire gateway selection information from scratch before each call. Instead, the user pre-selects a portion of the gateway selection information which the user terminal then stores and uses for user terminal originated communications session access, such as user terminal originated calls. This pre-selected routing information is then automatically transmitted by the user terminal to the satellite during call initiation.

In one embodiment, the user supplies at least a portion of the gateway selection information which is then used as a default for subsequent calls until changed by the user. For example, the user may select a country code and national destination code combination to use as a default. Thereafter, the user may enter a subscriber number and instruct the user terminal to initiate a call. For example, a user may enter a seven digit number on a keypad and then press a send button. The user terminal then transmits the default country code and national destination code as gateway selection information to the satellite during the channel request portion of call initiation. In this manner, the operation of the user terminal, after selection of the default portion of the gateway selection information, is very similar to the operation of terrestrial telephones in the United States. If no country code or national destination code is entered, then the user terminal will assume that the default values are to be used and supply the same to the NCC. Obviously, if another country code and/or national destination code is entered by the user (call-specific gateway selection information), then the corresponding default values would not be used. Preferably, the user is allowed to change the defaults when desired.

In a simple embodiment of the invention, the default values correspond to the MCC and MNC and the user terminal derives the default values from the active subscription for the user terminal without the need of any user intervention. That is, the default values point to the user's home gateway.

For illustrative purposes, the portion of the gateway selection information pre-selected as a default in the discussion above included both a country code and national destination code. However, the present invention also encompasses pre-selecting only a default country code and requiring the national destination code to be selected for each call. The user terminal must then detect the access type of the dialed number, identify the missing portions of the gateway selection information, provide the missing portions accordingly.

The selection of the country code, the national destination code, and even the subscriber number may be through manual entry of the codes via a keypad, or by selection from a list displayed by the user terminal, or through voice recognition, or any other method of entering information or choosing from an available list.

In another embodiment, a portion of the gateway selection information is associated with a symbol. Thereafter, the user selects the symbol immediately before selecting a subscriber number. For example, the gateway selection information may be associated with a particular key on a keypad. In such a situation, the user would press that particular key and then enter the subscriber number and instruct the user terminal to initiate a call (such as by pressing a "send" button). The user terminal then transmits the country code and national destination code associated with the symbol to the satellite during the channel request portion of call initiation.

Preferably, the user is allowed to associate a plurality of symbols, such as a plurality of keys, with a corresponding plurality of gateway selection information sets. For instance, the keypad may include a plurality of "country" keys, with each country key being associated with a particular gateway selection information set. Alternatively, the keypad could contain a single country key which the user can be variably associate with any one of a variety of gateway selection information sets, chosen for instance from a menu.

In another embodiment, the use of the symbol of the embodiment described immediately above may cause the user terminal to use the Mobile Country Code (MCC) and Mobile Network Code (MNC) information contained in the user terminal's own active subscription as a proxy for country code and national destination code. In one such embodiment, pressing a particular key, such as the "-" key, before entering the subscriber number will cause the user terminal to automatically derive the home MCC and MNC and use them as gateway selection information. In this manner, "home" country destinations can be easily dialed, or recalled from memory, and directed to the home gateway. This can be done when the user is at home or abroad, but is particularly useful when the user is abroad.

The discussion above has used an ACeS satellite communications system for illustrative purposes; however, the present invention is not limited to ACeS systems, and works in any satellite communications system which requires the user terminal to provide information during the very early stages of call initiation so that the satellite communications system may properly route the call to a gateway or gateway equivalent.

The user terminal may be any satellite communications device, such as a hand-held satellite phone, a personal computer with satellite communications capability, a personal communications device with satellite communications capability, or the like. It should be noted that some user terminals may be capable of multiple modes of operation, such as satellite mode and terrestrial wireless communications system (e.g., cellular telephone) mode.

FIG. 1 is a general block diagram of one preferred embodiment of a user terminal device according to the present invention. For clarity of illustration, a user terminal adapted for satellite communications only, i.e., a satellite telephone, will be used as an example of a user terminal in the following discussion.

FIG. 1 is a block diagram of a typical digital satellite telephone 20 suitable for the present invention. The satellite telephone 20 includes a microprocessor 22, an operator interface 26, a transmitter 38, a receiver 50, and an antenna assembly 58.

The operator interface 26 typically includes a display 28, keypad 30, control unit 32, microphone 34, and speaker 36. The display 28 allows the operator to see dialed digits, call status, and other service information. The keypad 30 allows the operator to dial numbers, enter commands, and select options. The control unit 32 interfaces the display 28 and keypad 30 with the microprocessor 22. The microphone 34 receives acoustic signals from the user and converts the acoustic signals to an analog electrical signal. Speaker 36 converts that analog electrical signal from the receiver 50 to an acoustic signal which can be heard by the user.

The analog electrical signal from the microphone 34 is supplied to the transmitter 38. The transmitter 38 includes an analog to digital converter 40, a digital signal processor 42, and a phase modulator and RF amplifier 48. The analog to digital converter 40 changes the analog electrical signal from the microphone 34 into a digital signal. The digital signal is passed to the digital signal processor (DSP) 42 which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48 which are shown as a combined unit in FIG. 1. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52 which shifts the frequency spectrum and boosts the low level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the microprocessor 22. Speech data is processed by a speech decoder and passed to the digital to analog converter 56. The digital to analog converter 56 converts the speech data into an analog signal which is applied to the speaker 36 to generate acoustic signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62, as may be required for analog or dual-mode operation.

The microprocessor 22 coordinates the operation of the transmitter 38 and the receiver 50. This coordination includes power control, channel selection, timing, as well as a host of other functions. The microprocessor 22 inserts signaling messages into the transmitted signals and extracts signaling messages from the received signals. The microprocessor 22 responds to any control commands contained in the signaling messages, and implements those commands. When the user enters commands via the keypad 30, the commands are transferred to the microprocessor 22 for action. Memory 24 stores and supplies information at the direction of the microprocessor 22 and preferably includes both volatile and non-volatile portions as well as any memory associated with an inserted SIM card or equivalent. Included in memory 24 are the user terminal's MCC and MNC.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A call routing interface method for satellite communications user terminals, comprising:
    a) associating a multi-digit value with a single key at a satellite communications user terminal; said value representing at least a portion of gateway selection information, said portion comprising at least one of the group consisting of country code, mobile country code, national destination code, and mobile network code;
    b) thereafter, initiating, by a user, a call on a satellite communications system by selecting said key and thereafter selecting a subscriber number for a desired destination; and
    c) thereafter transmitting, by said satellite communications user terminal, said value to a satellite so as to provide gateway selection information to a satellite communications system during the channel request portion of call initiation.

2. The method of claim 1 further comprising choosing a gateway to handle said call based on said value.

3. The method of claim 1 wherein said value includes a country code.

4. The method of claim wherein said value includes a country code and a national destination code.

5. The method of claim 1 wherein said value includes a mobile country code and a mobile network code.

6. The method of claim 1 wherein said key is on a keypad associated with said satellite communications user terminal.

7. The method of claim 1 wherein said selecting of a subscriber number comprises manual entry of said subscriber number by a user on a keypad associated with said satellite communications user terminal.

8. The method of claim 1 wherein said satellite communications user terminal is adapted to also function in a terrestrial wireless communications system.

9. A call routing interface method for satellite communications user terminals, comprising:
    a) selecting, by a user, a destination country code from a plurality of country codes associated with a satellite communications system as a default;
    b) transmitting said default as at least a portion of gateway selection information by said satellite communications user terminal to a satellite during all subsequent channel request portions of call initiations on said satellite communications system by said satellite communications user terminal, unless said default is overridden by entry of call-specific gateway selection information, until said default is changed by a user.

10. The method of claim 9 wherein said selecting of a default destination country code comprises manual entry of said default destination country code by a user on a keypad associated with said satellite communications user terminal.

11. The method of claim 9, wherein said satellite communications user terminal is adapted to also function in a terrestrial wireless communications system.

12. A call routing interface method for satellite communications user terminals, comprising:
    a) selecting, by a user, a destination country code from a plurality of country codes associated with a satellite communications system and a national destination code from a plurality of national destination codes associated with said destination country code as a default;
    b) transmitting said default as at least a portion of gateway selection information by said satellite communications user terminal to a satellite during all subsequent channel request portions of call initiations on said satellite communications system by said satellite communications user terminal, until said default is changed by a user.

13. A satellite communications user terminal, comprising
    a) memory and a country code stored in said memory;
    b) a key associated with said country code;
    c) means for selecting a subscriber number;
    d) a controller operatively connected to said memory and said key and said means for selecting said subscriber number, said controller adapted to generate gateway selection information by appending said country code to said subscriber number when, during a call initiation by a user, said key is activated by the user prior to selection of said subscriber number;
    a transmitter operatively connected to said controller, said transmitter transmitting said gateway selection information to a satellite during the channel request portion of call initiation of a communications session.

* * * * *